July 16, 1946.   H. C. TRIMBLE   2,404,009
CAPSULE CONTAINER AND VENDER
Filed Oct. 12, 1944   3 Sheets-Sheet 1

INVENTOR.
H. C. Trimble
BY
Victor J. Evans & Co.
ATTORNEYS

July 16, 1946.  H. C. TRIMBLE  2,404,009
CAPSULE CONTAINER AND VENDER
Filed Oct. 12, 1944  3 Sheets-Sheet 2
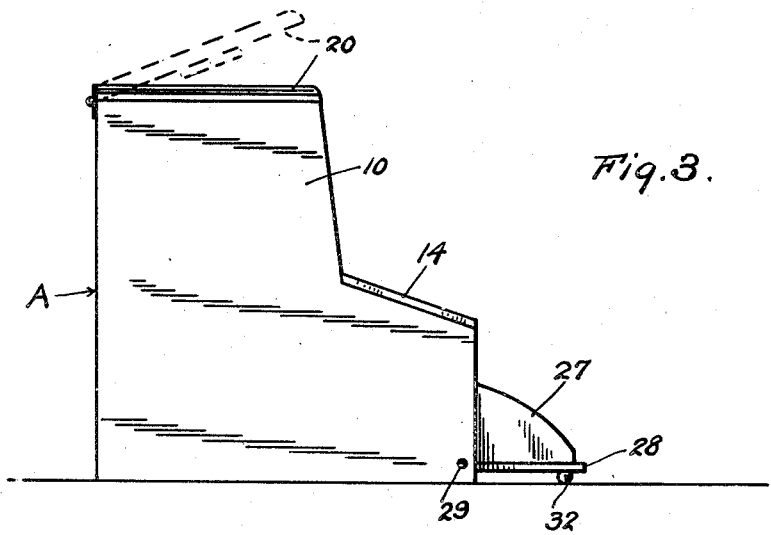
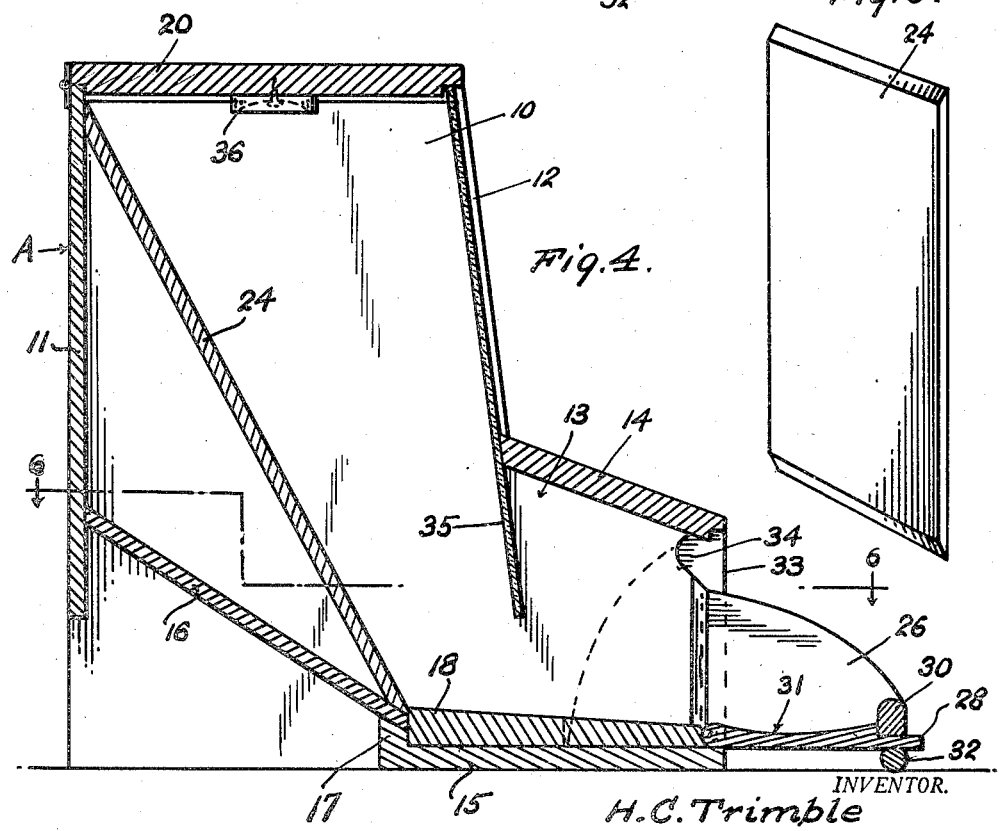
INVENTOR.
H. C. Trimble
BY
Victor J. Evans & Co.
ATTORNEYS July 16, 1946.　　　　H. C. TRIMBLE　　　　2,404,009
CAPSULE CONTAINER AND VENDER
Filed Oct. 12, 1944　　　　3 Sheets-Sheet 3
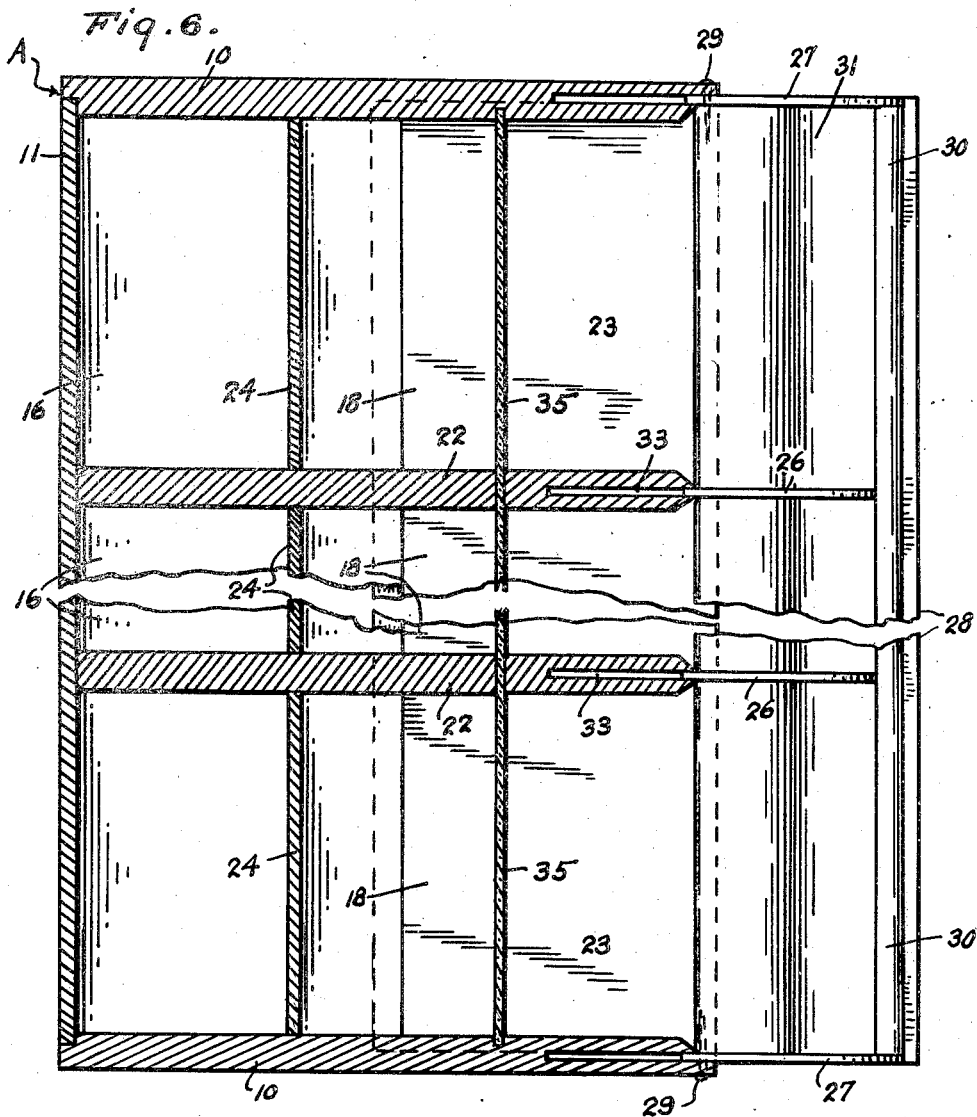
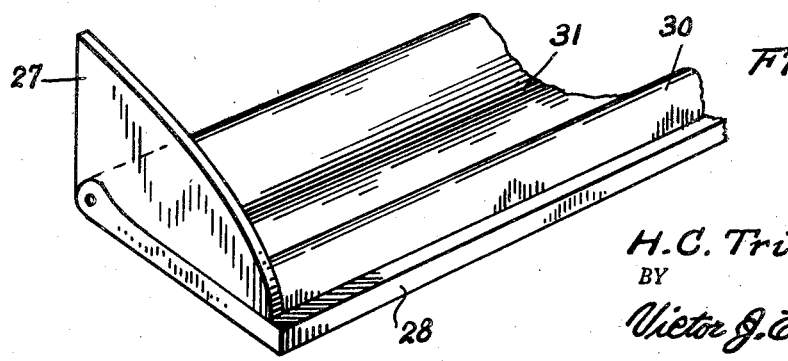
INVENTOR.
H.C. Trimble
BY
Victor J. Evans & Co.
ATTORNEYS Patented July 16, 1946

2,404,009

UNITED STATES PATENT OFFICE 2,404,009

CAPSULE CONTAINER AND VENDER

Harold C. Trimble, Miami Springs, Fla.

Application October 12, 1944, Serial No. 558,350

2 Claims. (Cl. 222—129)

The invention relates to a counter cabinet for use in drug stores or the like, and more especially to a capsule container and dispensing apparatus.

The primary object of the invention is the provision of an apparatus of this character, wherein capsules to be filled in drug stores or the like will be stored and when it is desired to make use thereof they can be readily dispensed and brought into a position, so that any number and sizes thereof can be acquired without the handling of the bulk thereof, and in this way avoiding mass contact with those not used, with resultant hand contamination.

Another object of the invention is the provision of an apparatus of this character, wherein different sizes and quantities of capsules can be sorted and held separated in bulk, the dispensing of the capsules being had through gravity, so that selected ones can be picked by hand, the apparatus being moisture, dust and insect proof.

A further object of the invention is the provision of an apparatus of this character, which is simple in construction, thoroughly reliable and efficient for the purposes intended thereof, strong, durable, enabling capsule handling with dispatch and the convenient acquiring thereof, and inexpensive to manufacture and install.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 3 is an end view.

Figure 4 is an enlarged vertical transverse sectional view through the apparatus with the front open.

Figure 5 is a perspective view of the removable chute board.

Figure 6 is a sectional view taken on the line 6—6 of Figure 4 looking in the direction of the arrows.

Figure 7 is a fragmentary perspective view of the front hinged tray and door.

Similar reference characters indicate corresponding parts throughout the several views in the drawings.

Figure 1:
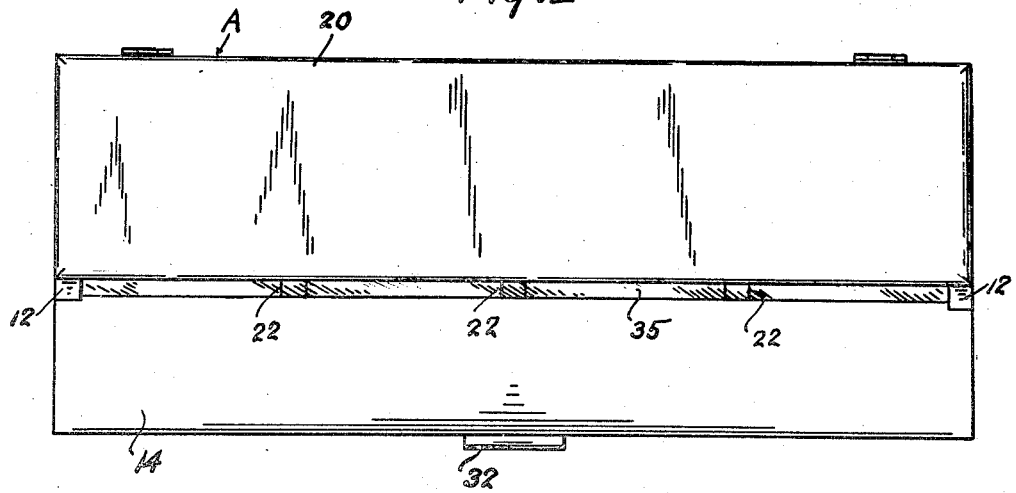
Figure 1 is a top plan view of the apparatus constructed in accordance with the invention.
Figure 2:
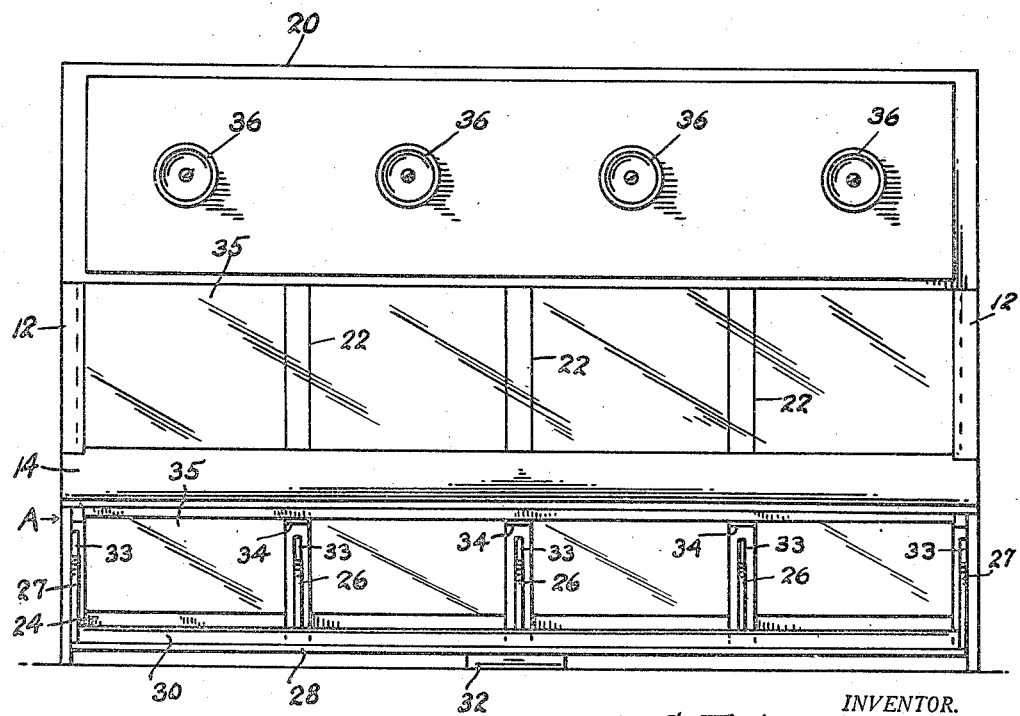
Figure 2 is a similar view with the top raised and the front open.

Referring to the drawings in detail, A designates generally the cabinet or apparatus constructed in accordance with the invention, and comprises an elongated body having opposite vertical side walls or ends 10, a vertical rear or back wall 11, which is unitary with the side walls or ends 10, a front having an upper glass paneled window 12, and a lower forwardly projected baylike or stepped outlet throat portion 13, provided with the forwardly inclined roof 14, and a bottom formed with a flat forward or front area 15, and a forwardly inclined rear area 16, respectively. The area 15 next to the area 16 is formed with a riser 17 overlapped by said area 16, while counterseated in this area 15 is a filler piece 18 having a forwardly inclined top face 19.

The uppermost portion of the body is open and the latter affords a filling opening, it being normally closed by a hinged cover or lid 20 which is connected to the rear or back wall 11 by the hinges 21 for opening and closing movements.

Interiorly of the body are vertically disposed spaced partitions 22 which are arranged crosswise from front to back of the body for dividing it into separated compartments 23 for the storing of capsules assorted therein, both as to sizes and quantities.

Within each compartment 23 is a removable gravity or chute board 24 which extends from the rear area 16 at its front edge to the top opening in the body and is effective as a backing to such compartment and gives a hopper-like formation thereto. The side walls or ends 10 and the partitions 22 in their front edges are formed with wing confining spaces 25 for vertically arranged intermediate and outer wings 26 and 27, respectively, as created on a drop-door 28. This door 28 vertically swings at its lowermost edge upon horizontal pivot pins 29, which are journaled in any suitable manner in the side walls or ends 10 next thereto of the body for the opening and closing of such door. Slightly inset from the outermost free edge of this door 28 and co-extensive with the length thereof is a stop ledge 30, it being counterseated in the inner face of the said door, while the inner face rearwardly of this ledge is longitudinally dished at 31 to effect a pocketed tray-like area for retaining capsules gravitating thereon from within the compartments and through the throat portion 13 of the body. The door when open has the inner face at the innermost edge thereof substantially flush with the filler piece 18 so that the capsules will not meet with obstruction under gravitation thereof.

The door 28 at the outer face thereof carries a suitable hand grip 32 which also constitutes a rest foot when such door is opened.

The door 28 when closed is counterseated at 33 in the framing thereof at the forward open end of the throat portion 13 at the front of the body, while the partitions 22 are notched at 34 to receive the ledge 30 for the complete snug fitting of the door to close the open end of this throat portion.

The window panel 12 has its lower end 35 depending within this throat portion 13 to regulate the flow of capsules over the filler piece 18 therein, the capsules of a determined quantity are introduced into the compartments 23 through the open top of the body and such capsules are fed through the throat portion 13 by gravity when the door 28 is opened, so that any given number of capsules can be picked by hand from the tray area 31 constituted at the inner face of such door, without spilling of these capsules, and the handling thereof in bulk is eliminated, as only those being used are handled for their removal from the body of the cabinet or apparatus.

The inner face of the cover or lid 20 is equipped with moisture absorbing disks 36 to relieve moisture from the interior of the body.

The window 12 gives visibility to the interior of the body so as to determine when the capsules are low or exhausted within the compartments 23.

The capsules are hand acquired from the tray-side of the door when the latter is opened.

What is claimed is:

1. An apparatus of the kind described, comprising a body having a forwardly projecting discharge throat portion at the lowermost portion of its front, vertical spaced partitions within the body for forming a plurality of separated compartments therein for communication with the throat portion, a door swingingly supported for opening and closing movements at the throat portion and having dished inner face forming a tray and wings built on the door and slidably interfitting the body and partitions for dividing the tray face of the door in conformity with the compartments and a removable backing in the compartments and inclined in the direction of the throat portion for gravity action of the contents of such compartments thereto.

2. An apparatus of the kind described, comprising a body having a forwardly projecting discharge throat portion at the lowermost portion of its front, vertical spaced partitions within the body for forming a plurality of separated compartments therein for communication with the throat portion, a door swingingly supported for opening and closing movements at the throat portion and having dished inner face forming a tray and wings built on the door and slidably interfitting the body and partitions for dividing the tray face of the door in conformity with the compartments, a removable backing in the compartments and inclined in the direction of the throat portion for gravity action of the contents of such compartments thereinto and a hinged cover closing the uppermost portion of the body for giving access thereto.

HAROLD C. TRIMBLE.